United States Patent [19]
Miller

[11] Patent Number: 5,325,272
[45] Date of Patent: Jun. 28, 1994

[54] FIBER OPTIC TRACK LIGHTING SYSTEM

[76] Inventor: Jack V. Miller, 700 N. Auburn Ave., Sierra Madre, Calif. 91024

[21] Appl. No.: 73,273

[22] Filed: Apr. 16, 1993

[51] Int. Cl.$^5$ .............................................. F21V 8/00
[52] U.S. Cl. .................... 362/32; 362/238; 362/240; 362/243; 362/250; 362/282; 362/306; 362/322; 362/440
[58] Field of Search .............. 362/32, 151, 152, 238, 362/239, 240, 241, 243, 249, 250, 282, 319, 322, 306, 440; 385/901, 33

[56] References Cited

U.S. PATENT DOCUMENTS

| | | | |
|---|---|---|---|
| 4,118,760 | 10/1978 | Cohon | 362/239 |
| 4,161,769 | 7/1979 | Elliott | 362/152 |
| 4,516,190 | 5/1985 | Kloots | 362/32 |
| 4,725,931 | 2/1988 | Bourdon | 362/151 |
| 4,866,581 | 9/1989 | Targetti | 362/249 |
| 5,050,047 | 9/1991 | Viner et al. | 362/32 |

*Primary Examiner*—Ira S. Lazarus
*Assistant Examiner*—Alan B. Cariaso

[57] ABSTRACT

A fiber optic track lighting system comprises an elongated track channel having a generally U-shaped cross-section on a longitudinal axis. The U-shaped channel has a base portion joined to the proximal edges of first and second depending legs having parallel distal edges including an inward-facing longitudinal groove along each edge. A plurality of luminaire holders have opposed edges slidably engagable into the respective inward-facing longitudinal grooves to hold a fiber optic luminaire on an optical axis parallel to, and positionable along, the longitudinal axis of the track channel. Fiber optic light guides receive light from a remote source of illumination, extend a distance within the track channel to a light-emitting end. An optical element retained in each luminaire intercepts the emitted light, producing a substantially collimated light beam along the optical axis. A mirror intercepts the collimated beam and reflects the light beam away from the optical axis and out of the channel between the depending legs. In the preferred embodiment the mirror reflecting the light beam is positionable by rotation about the optical axis of the respective luminaire and also positionable by rotation transversely to said optical axis.

16 Claims, 2 Drawing Sheets

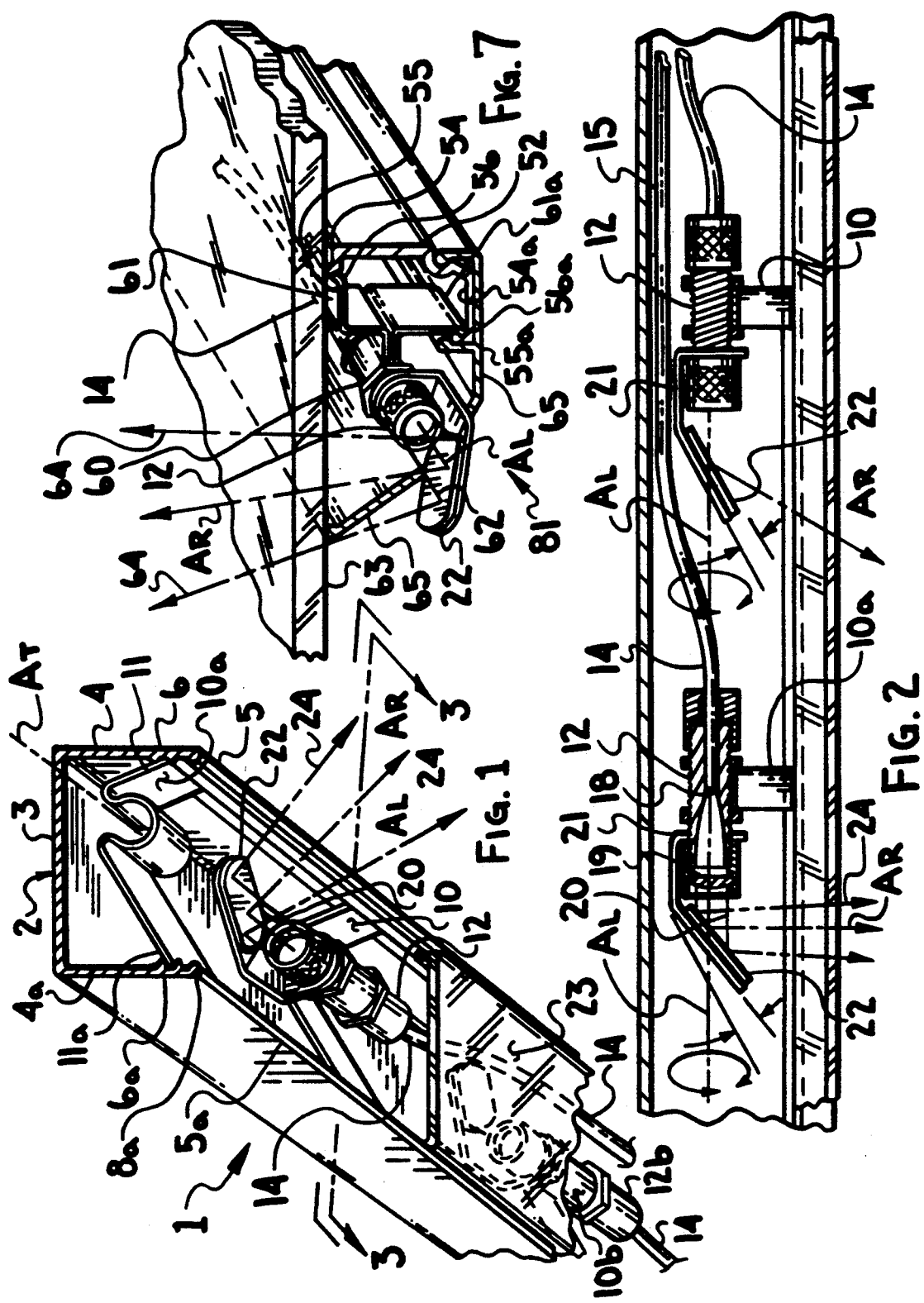

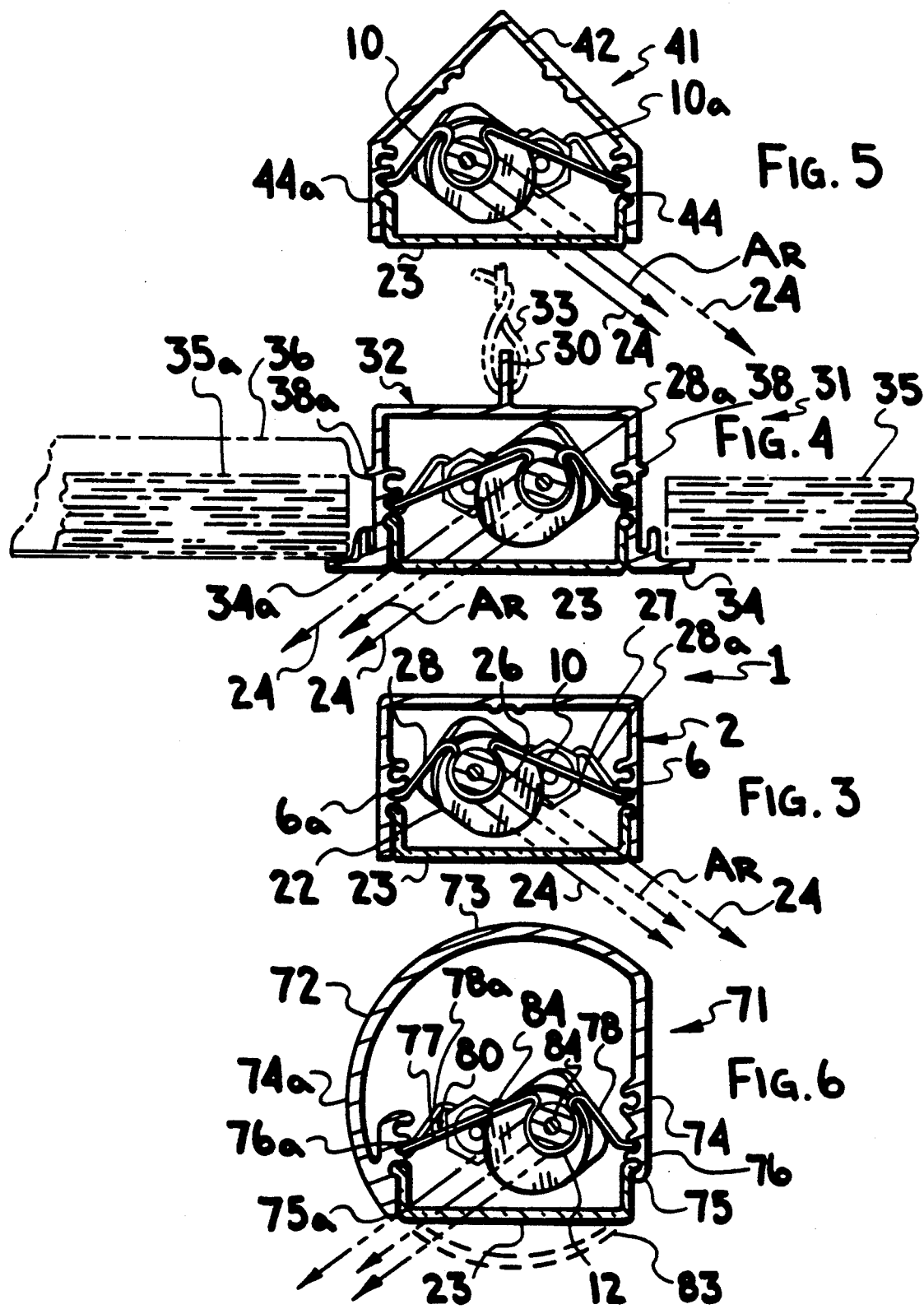

FIBER OPTIC TRACK LIGHTING SYSTEM

BACKGROUND OF THE INVENTION

Track lighting is well known in the art, as exemplified by the Inventor's U.S. Pat. Nos. 4,822,292, 4,812,834, D318,742, D318,143, and others. Track lighting is widely used because of its extreme versatility and its ability to accommodate changes, wherein a lighting fixture may be positioned at any point along the track and may be aimed in any direction from its attachment point. However, track lighting has has several significant disadvantages. The first such disadvantage is that the track fixtures generate substantial amounts of heat in the room, as well as radiant infrared heat in the light beams. The second significant disadvantage of track lighting is that, although the track itself is very compact, usually no more than a one-inch-high by two-inch-wide cross-section, all the fixtures hang downward from tracks on the ceiling 6 to 10 inches, providing an unattractive, cluttered ceiling appearance.

The clutter of the depending track liught fixtures may be eliminated by the use of small strip lights, in which a miniature track supports many tiny light bulbs aling its length. This approach is exemplified by systems such as shown in the applicant's U.S. Pat. No. 4,908,743. These systems are very limited in wattage, as the lamp heat is not readily dissipated; so they are incapable for use as general illumination.

Fiber optic lighting is also a known art, as exemplified by the applicant's U.S. Pat. No. 5,099,399. Such fiber optic systems overcome the track lighting disadvantage of excess heat in the room by placing the light source outside the room. The other track lighting disadvantage, having many unattractive depending light fixtures on the ceiling, is partially overcome by the unusually small size of fiber optic luminaires, such as those shown in the applicant's pending U.S. patent application Ser. No. 07/746,749.

It is known to mount fiber optic luminaires in fixed locations inlight bars, as shown in the Churchill U.S. Pat. No. 5,000,535. However, such presently-known fiber optic mounting channels must be very deep in order to accommodate the bend radius of the fiber optic light guides, as shown. Further, in order to provide optical control, the luminaires depend from the light bar, as seen in the Churchill patent.

The primary purpose of the present invention is to provide a fiber optic track lighting system that retains all of the light guides and the fiber optic luminaires hidden within a small channel that is no larger than conventional lighting track, without any external fixtures. It is a further purpose of the invention to provide a fiber optic track lighting system in which each fiber optic luminaire may be aimed, both longitudinally and transversely with repect to the track.

SUMMARY OF THE INVENTION

The disadvantages of both conventional track lighting systems and known prior art fiber optic light bar systems are overcome by the present invention in which a fiber optic track lighting system comprises an elongated track channel having a generally U-shaped cross-section on a longitudinal axis. The U-shaped channel has a base portion joined to the proximal edges of first and second depending legs having parallel distal edges including an inward-facing longitudinal groove along each edge.

In a preferred embodiment a plurality of luminaire holders have opposed edges slidably engagable into respective inward-facing longitudinal grooves to hold a fiber optic luminaire on an optical axis parallel to, and positionable along, the longitudinal axis of the track channel. The luminaire holders are preferably made of a flat spring material formed into an open circle and having flat ends that resiliently engage into the grooves of the track channel legs. In preferred embodiments the channel has an elongated lens covering the channel and having resilient edges engaged into respective additional inward-facing grooves in the channel.

A number of cross-sectional shape variations may be configured within the description of the "generally U-shaped cross-section" for aesthetic and mounting purposes, as long as the cross-section includes legs having parallel distal edges including inward-facing longitudinal grooves.

A fiber optic luminaire is retained in each luminaire holder on an optical axis parallel to the longitudinal axis of the track channel. The luminaires receive light from fiber optic light guides routed from a remote source of illumination. The light guides extend a distance within the track channel and are retained between the base of the track channel, the legs and luminaire holders. Each light guide has a light-emitting end retained on the optical axis of a fiber optic luminaire. An optical element retained in each luminaire intercepts the emitted light and may produce substantially collimated light beam along the optical axis.

A mirror intercepts the collimated beam along the optical axis of each fiber optic luminare and reflects the light beam away from the optical axis and out of the channel between the depending legs. In the preferred embodiment the mirror reflecting the light beam is positionable by rotation about the optical axis of the respective luminaire and also positionable by rotation transverse to the optical axis.

BRIEF DESCRIPTION OF THE DRAWINGS

FIG. 1 is a partial perspective view of a fiber optic lighting track system according to the invention, shown from the open side of a rectangular embodiment of the track channel having symmetrical legs;

FIG. 2 is a longitudinal cross-sectional view of the fiber optic lighting track system according to the invention.

FIG. 3 is a transverse cross-sectional view of the fiber optic lighting track system of FIG. 1, taken along section lines 3—3;

FIG. 4 is a transverse cross-sectional view of a fiber optic lighting track system according to the invention and having flanges for suspended ceiling support;

FIG. 5 is a transverse cross-sectional view of a fiber optic lighting track system according to the invention and having an angular base for corner mounting;

FIG. 6 is a transverse cross-sectional view of a fiber optic lighting track system according to the invention and having a generally arcuate channel track; and FIG. 7 is a partial perspective view of a second embodiment fiber optic lighting track system according to the invention and having asymmetrical channel legs.

DETAILED DESCRIPTION OF THE INVENTION

In FIG. 1 a perspective view of a fiber optic lighting track system 1 according to the invention, is shown from the open side of a rectangular embodiment of an elongated track channel 2 having a generally U-shaped cross-section on a longitudinal axis $A_T$, the U-shaped cross-section having a base portion 3 joined to the proximal edges of first and second depending legs 4 and 4a, said legs having parallel distal edges 5 and 5a, respectively. Inward-facing longitudinal grooves 6 and 6a, respectively, extend along each distal edges 5 and 5a of legs 4 and 4a.

A plurality of luminaire holders 10, 10a having opposed edges 11 and 11a engageable into respective inward-facing longitudinal grooves 6 and 6a in respective depending legs 4 and 4a.

A fiber optic luminaire 12, 12a, 12b is disposed in each luminaire holder 10, 10a, 10b, respectively on, for as many luminaires as desired. However, in order to clearly show the configuration of luminaire holders, the fiber optic luminaire is not shown in luminaire holder 10a. Fiber optic luminaires 12 are engaged into holders 10, 10a, holding luminaires 12 on luminaire optical axis $A_L$ parallel to the longitudinal axis $A_T$ of the track channel 2.

A second pair of inward-facing grooves 8, 8a retain respective flanges of an elongated lens 23 which may be used optionally to cover the luminaires.

As shown in FIG. 2, a plurality of fiber optic light guides 14 receive light at a first end from a remote source of illumination, which is not shown, but is similar to that describes in the applicant's above-reference U.S. Pat. No. 5,099,399. Each light guide has a portion 15 disposed a distance along track channel 2, which in practice may be as long as 20 feet, supporting dozens of fiber optic luminaires 12. Each light guide 14 has a light-emitting second end 18 retained on the optical axis $A_L$ of a respective luminaire 12. An optical element 19 is retained in each luminaire 12 on its optical axis $A_L$ and produces a substantially collimated light beam 20 along optical axis $A_L$.

A mirror 22 intercepts collimated beam 20 and reflects light beam 20 away from optical axis $A_L$ of the luminaire and out of track channel 2 between the depending legs 4 and 4a, on reflected axis $A_R$, becoming reflected light beam 24. Another fiber optic luminaire 12a is shown in track channel 2, being partially obscured by a lens 23 engageable into second inward-facing longitudinal grooves 8 and 8a in legs 4 and 4a, respectively. In all of the embodiments shown herein, fiber optic luminaires 10, 10a, 10b, etc., may be arbitrarily positioned at any desired location along track channel. There is a need for a moderate amount of aiming of the reflected beam 24 off a plane normal to the longitudinal axis $A_T$ of the track. Aiming out of the normal plane is simply accomplished by bending mirror bracket 21, so mirror 22 is at a 30° angle to optical axis $A_L$ of the luminaire; produces a reflected beam 24a.

In FIG. 3 track channel 2 of fiber optic lighting track system 1, of FIGS. 1 and 2, is shown in which each luminaire holder 10 is an elongated flat spring member having a central portion formed into a circular open loop 26 and opposite end portions 27 and 28 extending away from said loop and engageable into respective inward-facing grooves 6 and 6a in respective depending legs of track channel 3, whereby the luminaire holder may be slidably positioned along the track channel.

A luminaire 12 is shown retained by luminaire holder 10 having a generally cylindrical cross section which is retained within the open loop of the luminaire holder 10 which is asymmetrical, having unequal length end portions 27 and 28. Another luminaire holder 10a is shown reversibly engageable into respective inward-facing longitudinal grooves 6 and 6a, wherein one luminaire is closer to depending leg 4 and another luminaire 12a is shown closer to he other depending leg 4a. This permits the reflected beam optical axis $A_R$ to be aimed at a greater off-vertical angle in one direction or the other. If it is desired to have a number of luminaires aimed at a greater off-vertical angle in one direction, then a number of luminaire holders may be similarly positioned in track channel 2. In the background behind end portion 27 of luminare holder 10, the opposite end portion 28a of another luminaire holder may be seen.

In the transverse plane of all the embodiments shown, any mirror at any longitudinal location may be aimed by rotating the luminaire 12 in luminaire holder 10, whereby the reflected beam ay be aimed at much wider angles, limited only by obscuration from the respective channel. Referring again to FIG. 3, the luminaire holders 10, 10a, etc are shown asymmetric and alternating in orientation. This permits wide angle transverse aiming of any luminaire as desired, since any luminaire holder 10, 10a may be simply snapped out of its respective grooves 6 and 6a, and re-inserted into the track channel in reverse orientation. A further benefit of an alternating orientation is that the light guide 14 from one luminaire 12 is laterally offset from the adjacent luminaire, making longitudinal spacing potentially closer than is possible with axially-aligned luminaires.

In FIG. 4 a fiber optic lighting track system 31 is shown having a track channel 32, which is internally configured identical to FIGS. 1 and 2, but additionally has a centrally-positioned upstanding rib 30 on adapted for suspension by a ceiling support wire 33 (attachable to a mounting not shown) and outward-extending flanges 34 and 34a, adapted to support suspended T-bar ceiling panels 35 and 35a, respectively, along with one or more cross-T-bars 36.

The embodiment of track channel 32 of FIG. 4 thereby functions as a construction member commonly known as a "T-bar cailing main runner" to support suspended ceiling panels. The inclusion of upstanding ribs 36 and 36a to flanges 34 and 34a, respectively, in cooperation with lateral ribs 38 and 38a, respectively, permits engagement and support of commercially-available cross T-bars 36 to further support suspended ceiling panels 35 and 35a, shown in phantom. In this embodiment, when lens 23 (identical to lens 23 of FIG. 1) is in track channel 32, all luminaires are above the ceiling plane; and virtually invisible to the viewer, except for a slight lens glow at the light beams.

In FIG. 5 a transverse cross-sectional view is shown of a fiber optic lighting track system 41 according to the invention, having a track channel 42 for mounting in a corner structure shown in phantom. Walls 44 and 44a are identical in configuration to walls 4 and 4a, respectively, of FIG. 1 and 2, but in FIG. 4 base portion 43 of track channel 42 has a 90° included angle central portion intersecting walls 44 and 44a at an angle of 45°. In this embodiment, when lens 23 (identical to lens 23 of FIG. 1-3) is in track channel 42, all luminaires are hidden within track channel 42.

In FIG. 6 a transverse cross-sectional view of a fiber optic lighting track system 71 is shown according to the invention and having a generally arcuate channel track channel 72 having a generally U-shaped cross-section on a longitudinal axis perpendicular to the plane of the paper. The U-shaped cross-section of track channel 72 has a base portion 73 joined to the proximal edges of first and second legs 74 and 74a, said legs having parallel distal edges 75 and 75a, respectively.

Inward-facing longitudinal grooves 76 and 76a, respectively, extend along each distal edges 75 and 75a of legs 74 and 74a. A plurality of luminaire holders 80, 80a, etc., having opposed edges 77 and 78 engageable into respective inward-facing longitudinal grooves 76 and 76a in respective legs 74 and 74a. A fiber optic luminaire 12 (identical to fiber optic luminaires of FIG. 1) is disposed in each luminaire holder 80 in the manner described for retaining luminaires 12 in luminaire 10 in FIG. 1. A plurality of fiber optic light guides 84 receive light at a first end from a remote source of illumination, which is not shown.

Track channel 72 is optionally provided with flat leg 74 for mounting to an external support, such as a railing or series of posts on a base. Track channel 72 is shown closed by a flat lens 23, identical to that used in FIGS. 1-5, but channel 72 may optionally be closed by a convex lens 83, shown in phantom.

In FIG. 7 a fiber optic lighting track system 81 according to the invention has an asymmetrical track channel 52 and legs 54 and 54a having respective parallel distal edges 5 and 5a, which have respective inward-facing grooves 6 and 6a. A plurality of luminaire holders 60 have opposed edges 61 and 61a engageable into respective inward-facing longitudinal grooves 56 and 56a in respective depending legs 54 and 54a. A fiber optic luminaire 12 (identical to fiber optic luminaires of FIG. 1) is disposed in each luminaire holder 60 in the manner described for retaining luminaires 12 in luminaire 10 in FIG. 1.

A mirror 22 (identical to mirror 22 of FIG. 1) intercepts collimated beam 62 and reflects light beam 64 away from optical axis $A_L$ of the luminaire and out of track channel 52 between legs 54 and 54a on reflected axis $A_R$. A light shield 65 is attached to track channel 52 and extends into contact with planar lens 63, which is a portion of the window of a display case (not shown) to illuminate exhibits from outside the case.

The primary purpose of the present invention, to provide a fiber optic track lighting system that retains all of the light guides and the fiber optic luminaires hidden within a small channel that is no larger than conventional lighting track, without any external fixtures; is accomplished by the embodiments described in the foregoing specification and drawings. The specific cross-sectional configurations shown are considered examples of practical and marketable configurations, and one skilled in the art might easily produce variations that are within the scope of the present invention. Fiber optic lighting tracks according to the invention have been manufactured and successfully operated as replacements for conventional track lighting systems using incandescent and halogen lamps.

I claim:

1. A fiber optic track lighting system comprising:
   an elongated track channel having a generally U-shaped cross-section on a longitudinal axis, said U-shaped cross-section having a base portion joined to the proximal edges of first and second depending legs, said legs having parallel distal edges;
   an inward-facing longitudinal groove along each distal edge of said leg;
   a plurality of luminaire holders having opposed edges engageable into respective inward-facing longitudinal grooves in respective depending legs;
   a plurality of fiber optic luminaires, each of said luminaires disposed in a luminaire holder and engaged therein on an optical axis parallel to the longitudinal axis of the track channel;
   a plurality of fiber optic light guides receiving light at a first end from a remote source of illumination, each light guide having a portion disposed a distance along the longitudinal axis of the channel, each of said light guides having a light-emitting second end retained on the optical axis of a respective luminaire;
   an optical element retained in each luminaire on its optical axis and producing a substantially collimated light beam along the optical axis from the light emitted from each respective light; and
   a mirror intercepting the collimated beam and reflecting the light beam away from the optical axis and out of the channel between the depending legs.

2. A fiber optic track lighting system according to claim 1 in which the mirror reflecting the light beam is positionable by rotation about the optical axis of the respective luminaire and also positionable by rotation transversely to said optical axis.

3. A fiber optic track lighting system according to claim 1 in which an elongated lens extends between the respective distal edges of the depending legs of the track channel.

4. A fiber optic track lighting system according to claim 1 in which the channel has a generally rectangular cross-section.

5. A fiber optic track lighting system according to claim 1 in which the track channel has a generally rectangular cross-section including outward-extending flanges appended to each of the depending leg whereby said outward-extending flanges are configured to support planar panels.

6. A fiber optic track lighting system according to claim 5 in which the base of the track channel has a centrally-positioned upstanding rib adapted for suspension by a ceiling support wire, whereby the outward-extending flanges may support suspended ceiling panels.

7. A fiber optic track lighting system according to claim 1 in which the base portion of the track channel has a centrally-disposed 90° included angle between two adjacent portions, each of said adjacent portions being joined to a respective depending leg at an angle of 45°, whereby the channel so configured can be mounted in a corner.

8. A fiber optic track lighting system according to claim 1 in which the base portion of the track channel is generally arcuate in cross section.

9. A fiber optic track lighting system according to claim 3 in which the base portion of the track channel has a generally arcuate convex cross section, and the lens also has a generally arcuate convex cross section, whereby the track channel so configured is generally cylindrical and can function as a light-emitting bannister.

10. A fiber optic track lighting system according to claim 9 in which the base includes a flat segment, and the lens has a generally arcuate convex cross section, whereby the track channel so configured can function as a light-emitting bannister which is mountable on its flat segment to a post or rail.

11. A fiber optic track lighting system according to claim 1 in which the track channel has depending legs of unequal length.

12. A fiber optic track lighting system according to claim 1 in which each luminaire holder is an elongated flat spring member having a central portion formed into a circular open loop and opposite end portions extending away from said loop and engageable into respective inward-facing longitudinal grooves in respective depending legs of the track channel.

13. A fiber optic track lighting system according to claim 12 in which the opposite end portions of said luminaire holder extending away from said loop are resiliently urged into engagement into respective inward-facing longitudinal grooves in respective depending legs of the track channel, whereby the luminaire holder may be slidably positioned along the track channel.

14. A fiber optic track lighting system according to claim 12 or 13 in which the luminaire holder holds a luminaire having a generally cylindrical cross section which is retained within the open loop of the luminaire holder.

15. A fiber optic track lighting system according to claim 12 or 13 in which the luminaire holder is asymmetrical, having unequal length end portions whereby said luminaire holder is reversibly engageable into respective inward-facing longitudinal grooves in respective depending legs of the track channel, with the circular open loop closer to one of the depending legs.

16. A fiber optic track lighting system according to claim 1 in which the fiber optic light guides are retained between the base of the track channel, the legs and luminaire holders.

* * * * *